UNITED STATES PATENT OFFICE.

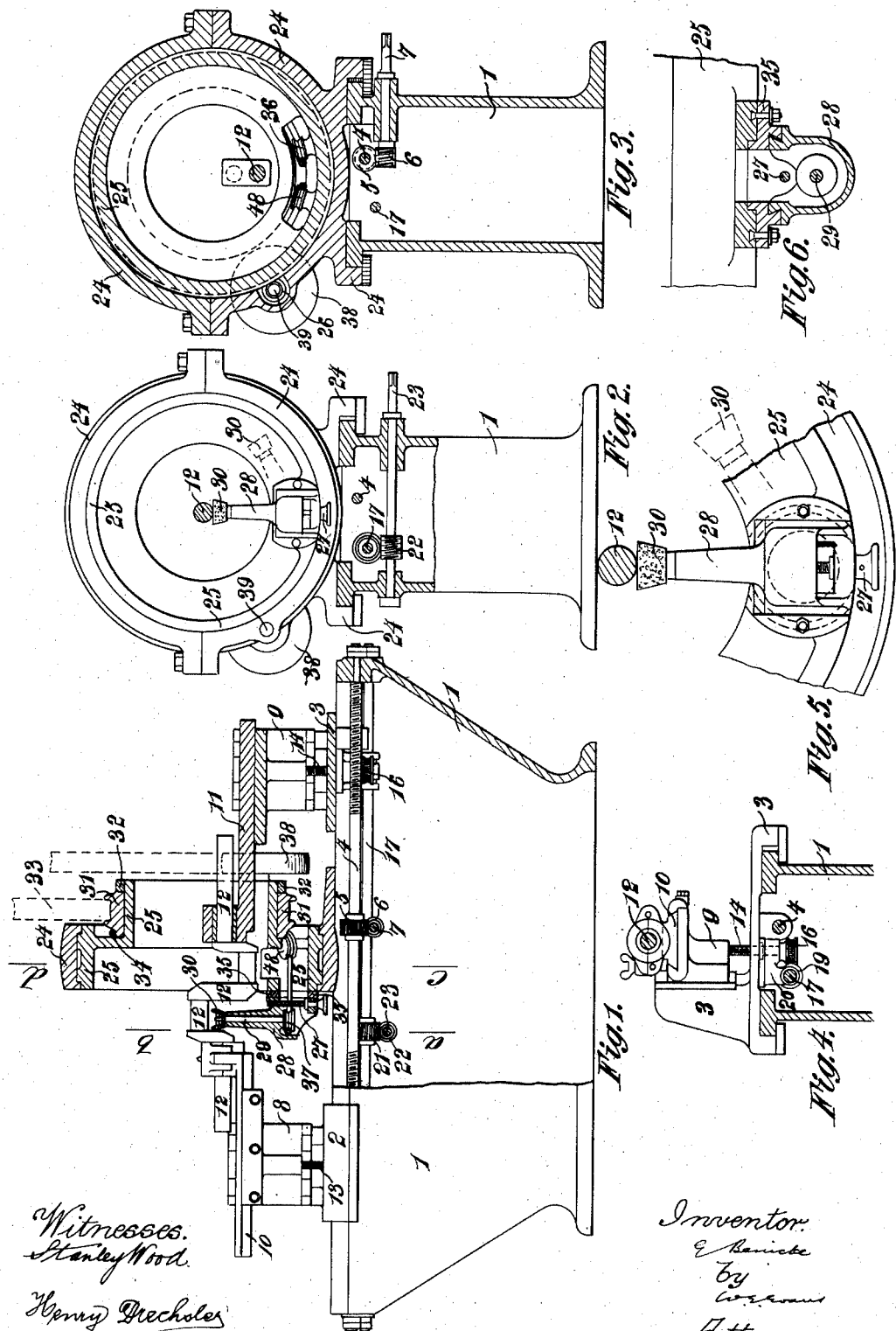

GEORG BENICKE, OF OFFENBACH-ON-THE-MAIN, GERMANY.

APPARATUS FOR GRINDING CRANK-SHAFTS.

No. 864,880.        Specification of Letters Patent.        Patented Sept. 3, 1907.

Application filed March 20, 1906. Serial No. 307,092.

*To all whom it may concern:*

Be it known that I, GEORG BENICKE, a subject of the German Emperor, residing at Offenbach-on-the-Main, in the Empire of Germany, (whose post-office address is superintending engineer of the firm of Maya and Schmidt, of Lowenstrasse, Offenbach-on-the-Main, Germany,) have invented certain new and useful Apparatus for Grinding Crank-Shafts, of which the following is a specification.

In the accompanying drawings, Figure 1 is a longitudinal section of the apparatus, Fig. 2 is a transverse section corresponding to the line $a$—$b$ of Fig. 1, Fig. 3 is a transverse section corresponding to the line $c$—$d$ of Fig. 1. Fig. 4 is an end view of the bed of the crank shaft, with the bed plate in section. Fig. 5 shows the method of mounting the oscillating tool-holder, and Fig. 6 is a section through this mounting.

The construction of the apparatus and the method of operating it are as follows.—

Upon the bed plate 1 there are secured by means of screw shafts, 4, longitudinally movable carriages 2 and 3. The screw shaft 4 is actuated by means of a worm wheel 5 keyed thereon, a worm 6 and a shaft 7. The carriages 2 and 3 support vertically movable rests 8 and 9 to which there are attached longitudinally adjustable supporting arms 10 and 11 whereunto the crank shaft 12 is firmly attached by suitable means. The crank shaft can thus be adjusted both vertically and parallel to the bed. This is effected by means of screw shafts 13 and 14 provided upon the rests 8 and 9. Each of these screw shafts is furnished at its lower end with a worm wheel 16 which can be rotated by means of a worm 19 that is laterally displaceable upon the shaft 17. When the rests are longitudinally displaced the worms 19, which are so connected by a key and keyway with the shaft 17 that they rotate therewith but are displaceable in the direction of the length thereof, are positively moved along the shaft 17 by laterally projecting arms 20, whereby they are caused to remain in gear with the worm wheel 16. The shaft 17 is rotated by means of a worm wheel 21, keyed thereon, and a worm 22 upon a shaft 23, Fig. 2. The carriages 2 and 3 can by rotating the shaft 7 be simultaneously moved in the longitudinal direction, but they remain at rest when the shaft 23 is rotated for the purpose of simultaneously raising or lowering the rests 8 and 9.

The actual grinding is effected in the manner now to be described by means of an emery cylinder 30 that moves around the work.

A divided ring 24 is arranged upon the bed 1 in such a manner as to be displaceable in the longitudinal direction of the bed, (Fig. 3). In this ring 24 there moves an undivided ring 25 provided with teeth which can be slowly rotated by means of a toothed wheel 26, a shaft 39 and a belt pulley 38. On the front of the ring 25 there is mounted upon a rotating part 35 as shown in Figs. 1, 5 and 6 the carrier 28 of the shaft of the grinding wheel which can be displaced by means of supports actuated by the screw shaft 27. The shaft 29 of this wheel is mounted in the carrier 28 and the wheel itself consists of an emery cylinder 30 the front surface of which moves over the part of the crank shaft to be ground whenever the ring 25 and the grinding apparatus are rotated.

For the purpose of enabling the grinding-operation to be inspected and of facilitating the adjustment of the crank shaft, the arrangement is such as to enable the carrier 28 of the grinding shaft to assume the position indicated in Fig. 2. This is effected by mounting the carrier 28 upon the rotatable part 35.

The rotation of the shaft 29 is effected in the following manner.—A belt-pulley 31 which is protected against lateral displacement by means of an adjustable ring 32 is rotatably mounted upon an adjustable rim of the ring 25. The belt-pulley 31 is actuated by means of a belt 33 which is restricted at the sides by means of rims and the breadth of which is less than that of the pulley. Between one of these rims and the wall of the ring there is placed a cord 34 (Fig. 1) which runs over grooved pulleys 36 and 48 (Fig. 3), which are rotatably mounted on the ring 25, as well as over the disk 37, whereby the emery grinding wheel 30 together with its shaft 29, is caused to rotate.

The apparatus is operated as follows.—After the carrier 28 has been turned aside, the crank-shaft 12 is fixed in position and by rotating the shafts 7 and 13 it is suitably adjusted both longitudinally and vertically, the emery cylinder is thereupon accurately adjusted by means of the screw 27, the carrier 28 having first been caused to assume its working position. When the apparatus is in operation the emery wheel not only rotates around its axis, but also revolves around the work, during this rotation which proceeds at a low speed, the emery wheel may be adjusted. While the grinding is being carried out the crank shaft 12 must be moved to and fro over the grinding wheel 30. This is effected by rotating the shaft 7 either by hand, or automatically by means of suitable mechanism. When the accessible portion has been ground the emery wheel must be turned aside whereupon the crank shaft is rotated through an angle of 180°; laterally adjusted and the emery wheel again caused to assume its operative position.

What I claim as my invention and desire to secure by Letters Patent is:—

Apparatus for grinding crank shafts consisting of an emery wheel (30), a rotating open ring (25), upon which the emery wheel (30) is mounted, and through which the crank shaft 12 passes, and two arms (10, 11) upon which the crank shaft 12 is supported, and means for moving the arms vertically and longitudinally in the direction of the axis of the shaft.

In testimony whereof I have hereunto signed my name to this specification in the presence of two subscribing witnesses.

GEORG BENICKE.

Witnesses:
KARL BROCKMANN,
JEAN GRUND.